Figure 1:
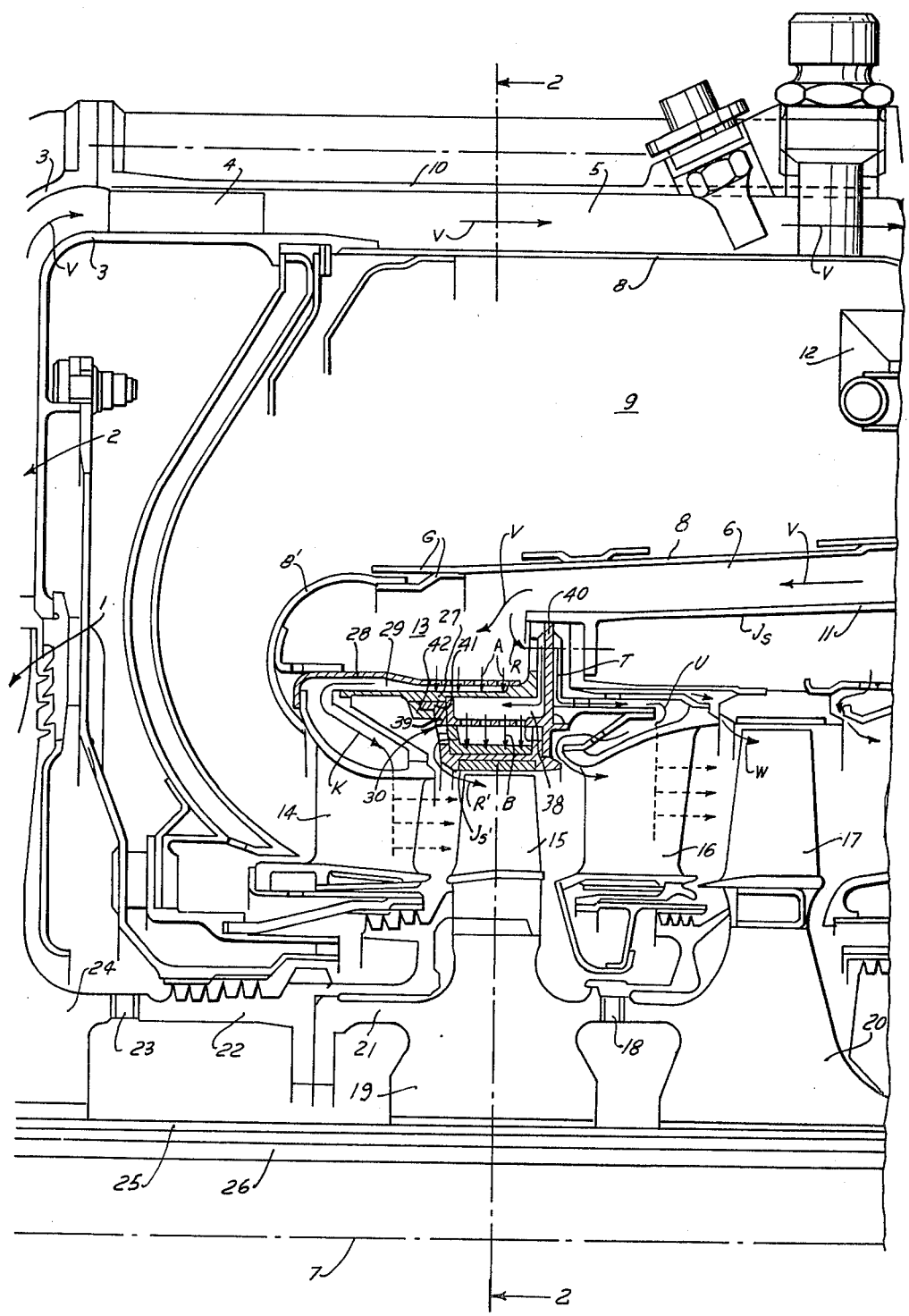

United States Patent [19]

Weiler et al.

[11] 4,439,982

[45] Apr. 3, 1984

[54] ARRANGEMENT FOR MAINTAINING CLEARANCES BETWEEN A TURBINE ROTOR AND CASING

[75] Inventors: Wolfgang Weiler; Klaus Trappmann, both of Dachau, Fed. Rep. of Germany

[73] Assignee: MTU Motoren-und Turbinen-Union Munchen GmbH, Munich, Fed. Rep. of Germany

[21] Appl. No.: 393,920

[22] Filed: Jun. 30, 1982

Related U.S. Application Data

[63] Continuation of Ser. No. 122,087, Feb. 19, 1980, abandoned.

[30] Foreign Application Priority Data

Feb. 28, 1979 [DE]  Fed. Rep. of Germany ....... 2907748

[51] Int. Cl.³ .................... F02C 7/18; F01D 11/08; F01D 25/12
[52] U.S. Cl. .................... 60/39.32; 60/39.36; 415/117; 415/136; 415/139
[58] Field of Search ............... 415/116, 117, 134, 136, 415/138, 139; 60/39.32, 39.36

[56] References Cited

U.S. PATENT DOCUMENTS

| | | | |
|---|---|---|---|
| 2,625,013 | 1/1953 | Howard | 60/39.32 |
| 2,859,934 | 11/1958 | Halford | 415/137 |
| 3,115,011 | 12/1963 | Deinhardt | 60/39.36 |
| 3,391,904 | 7/1968 | Albert | 415/116 |
| 3,583,824 | 6/1971 | Smuland | 415/134 |
| 3,892,497 | 7/1975 | Gunderlock | 415/138 |
| 4,013,376 | 3/1977 | Bisson | 415/139 |
| 4,053,254 | 10/1977 | Chaplin | 415/116 |
| 4,171,614 | 10/1979 | Weiler | 415/138 |
| 4,195,476 | 4/1980 | Wood | 60/39.32 |
| 4,251,185 | 2/1981 | Karstensen | 415/136 |

FOREIGN PATENT DOCUMENTS 593841  3/1960  Canada ................. 415/139

*Primary Examiner*—Douglas Hart
*Attorney, Agent, or Firm*—Alan H. Levine

[57] ABSTRACT

An annular sleeve surrounds a turbine rotor and is fixed to a stationary part, the sleeve being elastically deformable in a radial direction. A wear ring is carried by the sleeve, the wear ring being composed of segments arranged end-to-end circumferentially. The adjacent ends of the segments are spaced apart at all operating conditions of the turbine. The thermal expansions of the turbine rotor and of the sleeve and ring are so related that under operating conditions of the turbine, when the engine of which it forms a part is running, the sleeve thermally expands radially. The rate of thermal expansion of the stationary part is directly related to the rate of thermal expansion of the turbine rotor. Air leaving the compressor is directed against the sleeve and the stationary part carrying the sleeve. The wear ring and portion carrying the sleeve may be insulated. The sleeve may be mounted on a combustion chamber surrounding the turbine.

1 Claim, 2 Drawing Figures

ARRANGEMENT FOR MAINTAINING CLEARANCES BETWEEN A TURBINE ROTOR AND CASING

This application is a continuation of application Ser. No. 122,087, filed Feb. 19, 1980, now abandoned.

This invention relates to means for minimizing and maintaining the clearance prevailing in an axial-flow turbine between the free outer turbine rotor blade tips, or an outer shroud of the turbine rotor blades, and an adjacent turbine casing, especially in a gas turbine engine.

Small output gas turbine engines, of both turboshaft and turbojet construction, are often provided with a reverse-flow annular combustion chamber and an axial-flow turbine. The highly efficient operating cycles sought, with their high specific outputs or high specific thrusts at moderate fuel consumptions, also dictate that the turbine driving the compressor be of small size. Therefore, the radial clearance between the bladed rotor wheel and the casing significantly affects the output, or the thrust, and the efficiency. If such gas turbine engines are additionally subjected to frequent abrupt changes in load conditions, it will be necessary to minimize the blade tip clearances, not only at steady-state operating conditions, but also at transient operating conditions when the transition is made from one output level to another. What aggravates the situation with engines of this type is the fact that as a result of the design concept of the compressor turbine, with its relatively low hub ratio in conjunction with a normally high ratio of the hub bore diameter to the rim diameter of the rotor disc, the amount of thermal expansion of the rotor blades is often more than one third of the total expansion of the rotor. Considering, however, that the thermal expansion of the rotor blades, much like the thermal expansion of the nozzle vanes and the casing, will rapidly follow the variations in working gas temperature, while the thermal expansion of the rotor disc clearly lags behind, it follows that state-of-the-art constructions designed to minimize blade tip clearances and keep them constant, are not entirely satisfactory. For example, with a nozzle guide vane support arrangement, it is practically impossible to give the turbine a stator a sufficient amount of thermal storage capacity for engines of this type.

It is a broad object of the present invention to provide means for minimizing and maintaining the blade tip clearances in axial-flow turbines for turbomachines, especially for gas turbine engines, over a maximally wide operating range, and also in the presence of transient operating conditions.

The advantages and principles of operation of the present invention are described below.

At all operating conditions, the segmented wear ring exhibits a certain clearance circumferentially between its various segments. A certain radial clearance likewise exists between the blade tips and the wear ring. At rising engine speed (where the rate of change in output is for the present considered small enough to ignore), the turbine casing or nozzle guide vane support and elastic sleeve will grow radially largely as a function of the compressor exit temperature, while the ring segments will grow circumferentially largely as a function of turbine entry temperature. At the same time, heat will flow from the segmented wear ring, over its frontal area, into the elastic sleeve to heat the suspension area of the wear ring segments and elastically expand this component. The gap existing between the rotor and the wear ring, then, is ultimately controlled on the casing side by the combination of thermal expansion and elastic deformation of the elastic sleeve. When the engine is governed down to a lower output, the thermal expansion profile of the segmented wear ring is reversed analogously.

At abrupt load variations, e.g., when accelerating from a low output level to a higher level, the segments of the wear ring, as well as the turbine rotor blades, very rapidly follow the temperature associated with the new steady-state operating condition and expand circumferentially. Owing to the circumferential clearance between the segments, the diameter of the segmented wear ring is controlled by the thermal expansion of the sleeve in the segment suspension area, which is supplied with air bled from the compressor exit. Owing to its mass (thermal store), and perhaps to thermal insulation provisions, the thermal expansion of the nozzle vane support occurs at a relatively large time constant. Considering that the compressor exit temperature spontaneously follows the new steady-state load point of the engine, the thermal expansion of the sleeve takes place at a relatively small time constant, i.e., about as rapidly as the thermal expansion of the rotor blades. The heating and the attendant thermal expansion of the elastic sleeve under the influence of the heat transmitted form the wear ring segments occurs with a certain delay corresponding to the delay with which the rotor disc heats up after the rotor blades. The time constant of this process is controlled by the selected size of the frontal area of the segmented wear ring, and by the configuration of the mating areas between the segments and the elastic sleeve, for the particular engine application.

When the load is reduced abruptly from a higher to a lower setting, the various processes will be reversed: The segments of the wear ring first follow, at approximately the same time constant as the rotor blades, the temperature corresponding to the new operating condition, which causes them to shrink circumferentially. Simultaneously the cooling of the elastic sleeve with air from the compressor exit causes radial skrinkage in the segment suspension area, which in turn causes a reduction in the diameter of the segmented wear ring at a smaller time constant, i.e., about as rapidly as the shrinkage of the rotor blades. Thermal balance of the segment suspension area will then occur and cause further cooling of the elastic sleeve and, thus, a reduction in the diameter of the segmented wear ring, yet with a larger time constant i.e., about as rapidly as the shrinkage of the rotor disc. This configuration of the turbine stator thus ensures that the gas turbine engine involved can be operated at narrow rotor tip clearances over a wide range and also at transient operating conditions, which automatically benefits the performance and the efficiency of the engine.

Figure 2:
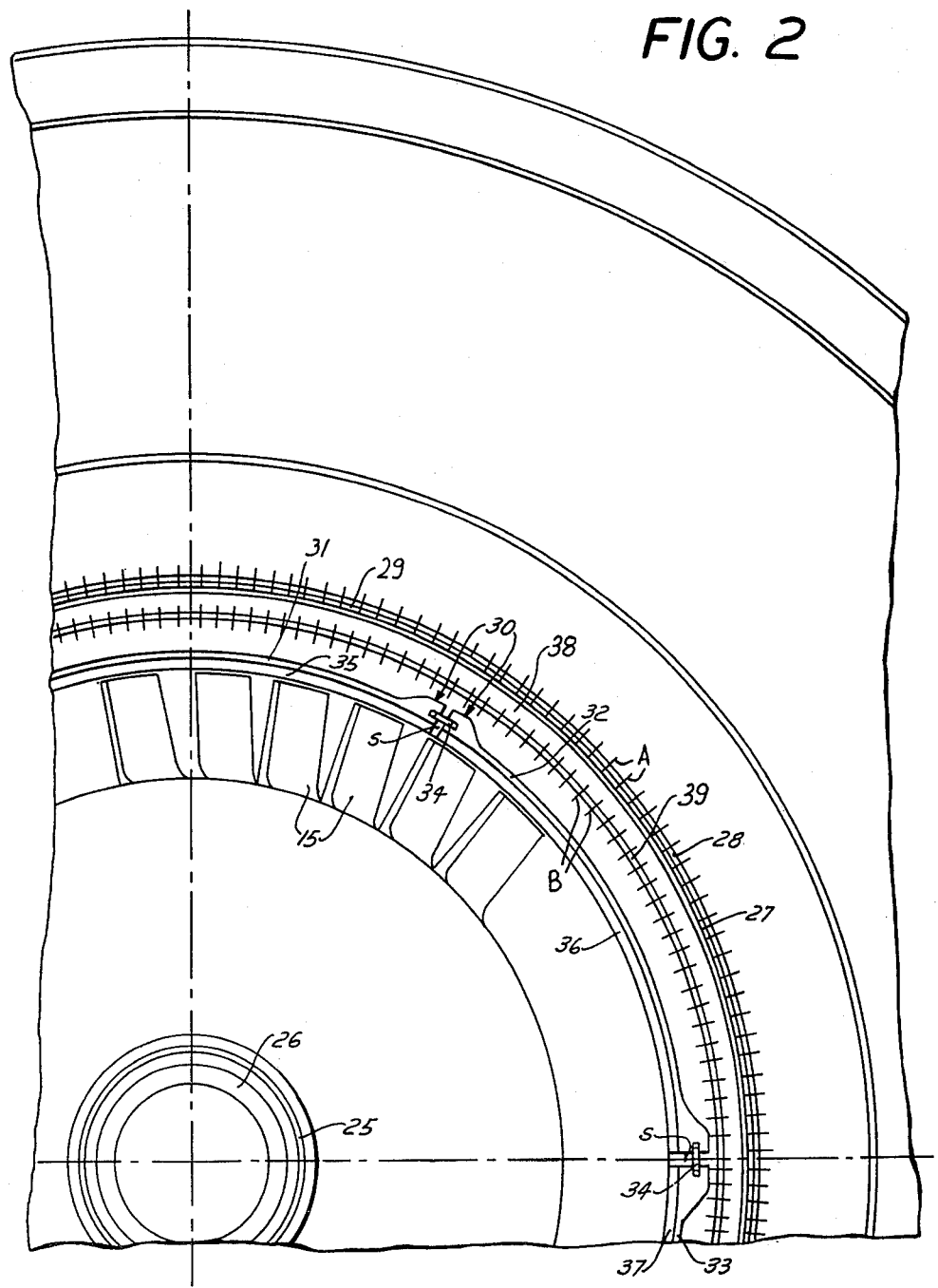

The invention is further described below with reference to the accompanying drawings, in which:

FIG. 1 is a fragmentary longitudinal cross-sectional view illustrating a gas turbine engine equipped with essential components according to the present invention; and FIG. 2 is a transverse cross-sectional view taken along line 2—2 of FIG. 1.

The gas generator of the engine of FIG. 1 comprises a centrifugal compressor 1 followed by a radial-flow diffusor 2 from which the flow V exiting from the compressor is deflected axially through an approximately 90-degree bend 3 to be ducted to an axial-flow cascade 4 behind the bend 3. From the axialflow cascade 4, the compressor air V reached a first annular duct 5 and, after flowing around the combustion chamber head, then reaches a second annular duct 6, both ducts being arranged coaxially to the longitudinal centerline 7 of the engine. The first and second ducts 5 and 6 are formed by the flame tube walls 8 of an annular, reverse flow combustion chamber 9 arranged coaxially to the longitudinal centerline 7 of the engine. The first and second ducts 5 and 6 are formed by the flame tube walls 8 of an annular, reverse flow combustion chamber 9 arranged coaxially to the longitudinal centerline 7, on the one hand, and by an outer casing wall 10 and a nozzle guide vane support 11 formed in continuation of and connected to said casing wall 10, on the other.

The vaulted rear wall of the flame tube, which is omitted on the drawing, is surrounded at a distance by the casing wall 10, which extends parallel to it. A portion of the incoming compressor air V is admitted to the combustion process through several, circumferentially equally spaced vaporizer tubes, exemplified by vaporizer tube 12 which are connected to the rear wall of the flame tube.

From the annular duct 6 the compressor air V flows into an annular duct 13 which connects directly to the duct 6 and which is radially expanded relative to the flame tube walls 8. From here it is routed to serve various cooling functions in a manner described more fully elsewhere herein.

The gas generator of the engine further comprises a two-stage turbine to drive the compressor, its nozzle guide vanes and rotor blades being indicated serially from left to right by the numerals 14, 15, and 16, 17, respectively. The two-stage compressor turbine also comprises two turbine rotor discs 19, 20 rotationally rigidly connected together by, among other means, circumferentially arranged teeth 18. The turbine rotor disc 19 is coupled to the disc 24 of the centrifugal compressor 1 through further rotor components 21, 22 and circumferentially arranged teeth 23.

In FIG. 1, the numeral 25 indicates a tie rod, taking the shape of a tubular shaft, for the gas generator groups. A tubular shaft 26 is accommodated within this tie rod to transfer the output of a power turbine, arranged mechanically independently downstream of the compressor turbine, to a gearbox arranged on the forward side of the engine.

With further reference to FIG. 1, an annular sleeve-shaped component 27, capable of radially elastic deformation, is suspended from the nozzle guide vane support 11. The sleeve 27 is supplied with air V taken from the compressor exit and directed, from annular duct 13 and a perforated sleeve 28, against the sleeve 27 in the form of high-energy air jets A (impingement cooling). The perforated sleeve 28 is connected to the sleeve 27 and also to a deflector bend 8', and it cooperates with the sleeve 27 to support the turbine inlet vanes 14. The deflector bend 8' is loosely suspended at its upstream end in a forked section G of the flame tube wall 8. The elements 8', 14, 27 and 28 form a structural unit. From the annulus 29, enclosed by the perforated sleeve 28 and the sleeve 27, a portion of the incoming compressor air is ducted as cooling air (arrowhead K) into the hollow vanes 14 to be returned to the gas stream after having done its cooling work.

Attached to the sleeve 27 is a wear ring 30 divided into segments 31, 32, 33 (FIG. 2) which at all operating conditions are arranged with a certain amount of circumferential clearance S between adjacent abutting edges. The various segments 31, 32, 33 of the wear ring 30 are circumferentially sealed one with the other by means of connecting plates 34.

With reference now to FIG. 2, the wear ring 30 is segmented in suitably selected sequence and provided with wearaway liners 35, 36, 37.

With reference again to FIG. 1, the segmented wear ring 30 is given impingement cooling (arrowheads B) by using a remaining portion of the air taken from the compressor exit, the air flowing into an annulus 38 from the annular duct 13 in the direction of arrow R. This annulus 38 is formed between a further perforated sleeve 39, the sleeve 27, and a support ring 40 attached to the nozzle vane support 11. Support ring 40 supports the rear end of the wear ring 30 and the turbine nozzle vanes 16. Also supported by support ring 40 is the rear end of the perforated sleeve 39. A residual air stream R' issuing from the annular duct formed between the wear ring 30 and the perforated sleeve 39 serves a sealing function and also provides film cooling along that surface of the wear ring 30 which faces the blade tips. Another air portion T, diverted from the annular duct 13, breaks down into a cooling air stream U, for the vanes 16, and into a further sealing or film cooling air stream W, for the second stage of the turbine.

As is apparent from FIG. 1, the segmented wear ring 30 is suspended from its end 41 projecting axially from collar-shaped step 42 of the sleeve 27.

A further feature of the present invention is that the frontal areas of the segmented wear ring 30 (shown cross-hatched in FIG. 1), and its immediate suspension means (ends 41) on the elastic sleeve 27, are sized such that the heating profile will be related to the thermal expansion of the turbine rotor disc 19 so as to ensure thermally elastic expansion of the sleeve 27; the material and configuration of the turbine nozzle vane support 11 is selected, especially with regard to the disposition of thermal insulation liners, to suit the amount and rate of thermal expansion of the turbine rotor disc 19.

With reference now to FIG. 1, the turbine nozzle vane support 11 is supplied and cooled with air V taken from the compressor exit, with a layer Js of thermal insulation arranged for best results on that side of the vane support 11 which faces away from the stream of compressor air V. The segmented wear ring 30 can likewise be furnished with a thermal insulation layer Js' on the surface facing the rotor blade tips. The thermal insulation Js, Js' can be provided to delay the thermal effect caused by the air taken from the compressor exit. The thermal insulation layers Js, Js' may be made from a ceramic material.

The state of the art will become apparent from German Pat. No. 859,089 and from the U.S. Pat. No. 3,583,824. German Pat. No. 859,089 teaches dividing a wear ring facing the turbine rotor blade tips into segments, and arranging these segments with circumferential clearence between them. U.S. Pat. No. 3,583,824 teaches providing a wear ring adjacent to the turbine rotor blade tips with impingement cooling.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. In a gas turbine engine having a rotor, a casing surrounding the rotor, a combustion chamber within the casing, and a compressor, an arrangement for maintaining minimal clearances between the radially-outermost surfaces of the turbine rotor and the turbine casing surrounding the rotor, the arrangement comprising:

(a) an annular sleeve surrounding the turbine rotor and fixed with respect to the turbine casing, the sleeve being elastically deformable in a radial direction, (b) a wear ring carried by the deformable sleeve, the wear ring being composed of segments arranged end-to-end circumferentially, the adjacent ends of the segments being spaced apart at all operating conditions of the turbine, (c) duct means for conducting air from the outlet of the compressor, the deformable sleeve being mounted on the duct means and the duct means forming part of the combustion chamber of the engine, one wall of the duct means having a forked section, (d) an annular perforated sleeve surrounding and connected to the deformable sleeve, air from the duct flowing through the perforations in the perforated sleeve and thereby being directed against the deformable sleeve, (e) means for directing air from the duct against the wear ring, (f) an annular deflector connected to the perforated sleeve, the deflector defining an end of the duct and being loosely retained within the forked section of the duct, and (g) layers of thermal insulation on the duct means and on the surface of the wear ring facing the rotor blades, the insulation being of ceramic material.

* * * * *